J. C. BIRDSELL.
Clover Thrasher and Huller.
No. 37,488. Patented Jan. 27, 1863.
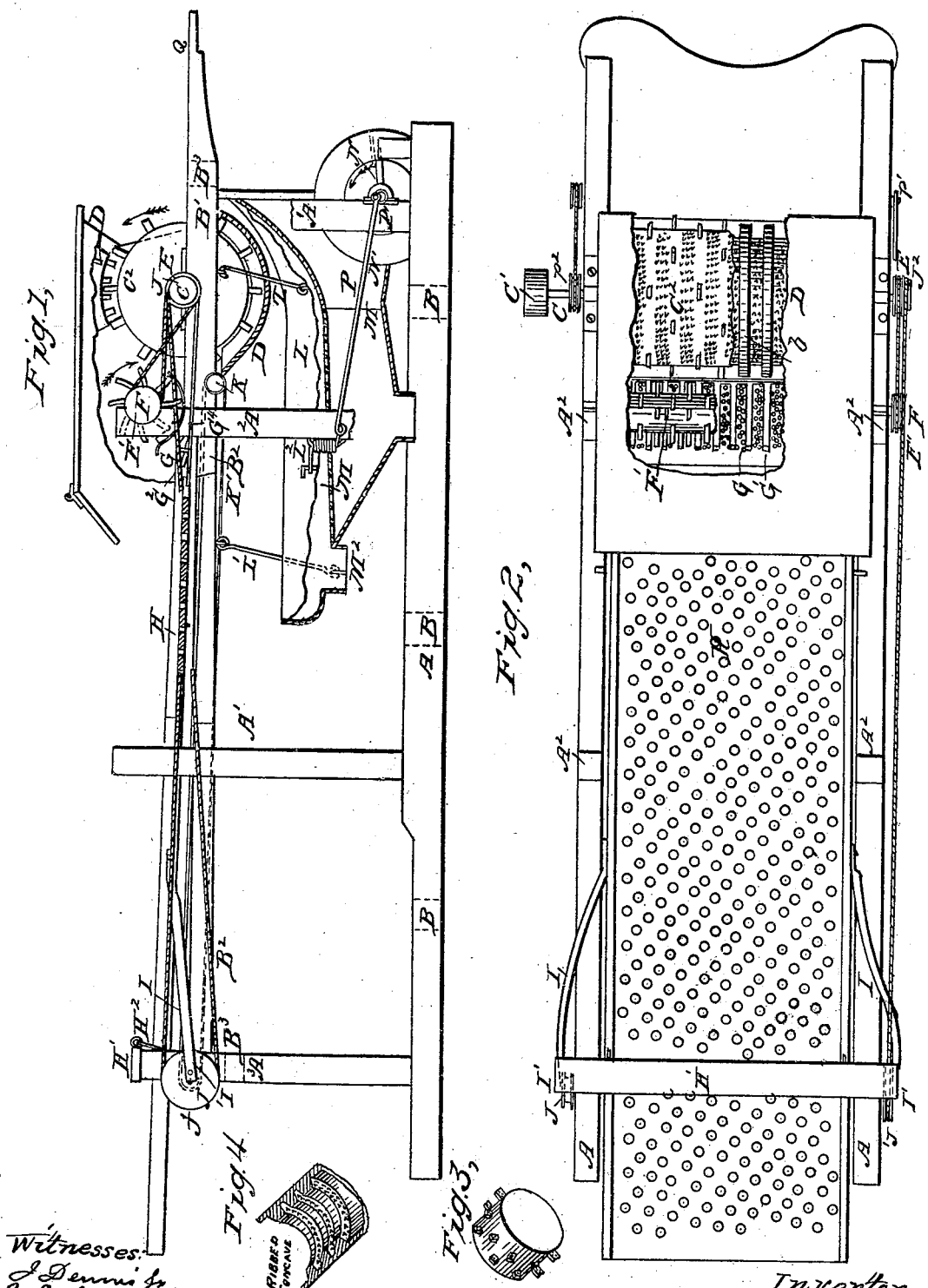

UNITED STATES PATENT OFFICE.

JOHN C. BIRDSELL, OF WEST HENRIETTA, NEW YORK.

IMPROVEMENT IN CLOVER THRASHERS AND HULLERS.

Specification forming part of Letters Patent No. 37,488, dated January 27, 1863.

*To all whom it may concern:*

Be it known that I, JOHN C. BIRDSELL, of West Henrietta, in the county of Monroe and State of New York, have invented a new, useful, and Improved Machine for Thrashing, Hulling, and Cleaning Clover-Seed; and I do hereby declare that the same is described and represented in the following specification and drawings.

To enable others skilled in the art to make and use my invention, I will proceed to describe its construction and operation, referring to the drawings, in which the same letters indicate like parts in each of the figures.

Most of the parts are drawn on a scale of one inch to the foot.

Figure 1 is an elevation of one side of my improved machine for thrashing, hulling, and cleaning seed; Fig. 2, a plan or top view of same.

The nature of my improved machine for thrashing and hulling clover-seed consists in providing a rotating thrashing and hulling cylinder with a thrashing concave or arch above and a hulling concave or arch below, so as to thrash the seed from the straw and stalks and hull it at one operation with one and the same cylinder; also, in providing a toothed thrashing-cylinder with a rough hulling surface between the teeth, and a ribbed concave or arch with a roughened or hulling surface on the ribs, with grooves between the ribs for the thrashing-teeth of a thrashing-cylinder to pass through said concave or arch; and in making ribs on a perforated concave screen to hold up the straw and stalks and allow the bolls and seed to fall through the screen and prevent the straw and stalks from dragging or carrying the bolls and seed across the holes in the screen; also, in arranging the crank-shaft to operate the bolt at the rear end of the machine.

In the accompanying drawings, A A are the sills of the frame, connected by the bars B B. (Shown by dotted lines.) The posts A' A² A³ are fastened in the sills A, and connected by the side bars, B' B², and by the cross-girders B³, the whole forming a strong frame to support the other parts of the machine fastened to it. The shaft C turns in boxes on the bars B', and is provided with a pulley, C', for a belt from some power to operate the machine. The shaft C carries the thrashing and hulling cylinder C², twenty inches in diameter, provided with teeth about one and one-half inches long and one and one-half inches apart lengthwise of the cylinder, with the rows of teeth seven inches apart. The teeth in one row are placed opposite the spaces in the next row. Over this cylinder there is a concave or arch, D, provided with four or more rows of teeth about one inch square, except the first row, which are made wedge-shaped, the teeth in the second row standing opposite the spaces in the first, and so on, and arranged so that the teeth on the cylinder will pass between the teeth on the arch in thrashing the clover. The cylinder C² is covered between the teeth with rings or strips of sheet metal with roughened surface, made rough like the rasps used for smoothing horse-hoofs, and adapted to hulling clover-seed, in connection with the arch or concave D' under the cylinder, which concave is made with ribs covered on their surface with strips of sheet metal, with a rough rasp surface like the cylinder just described, and placed about one eighth of an inch from the cylinder; and there are grooves $b\ b$ between the ribs of the concave for the thrashing-teeth on the cylinder to pass through as it is turned. The pulley E on the shaft C carries a belt to the pulley E' on the shaft F, which turns in boxes on the posts A², which shaft carries the picking-cylinder F', which takes the thrashed straw from the cylinder C² and carries it over the concave G and throws it onto the screen or bolt H. The picking-cylinder F' is about six inches in diameter, and turns in the direction indicated by the arrow, and is provided with teeth about three inches long and about three inches apart in each direction on the cylinder. These teeth pass between the ribs on the perforated concave G, and about one-fourth of an inch from the concave, and are bent or curved a little, as shown in the drawings. The concave G is perforated with holes about five-eighths of an inch in diameter and about five-eighths of an inch apart. It may be made of sheet metal. It has a series of ribs, G', on it about three-fourths of an inch square, and about three inches apart, to hold the straw and stalks up from the screen as they pass over it, and prevent them from dragging or carrying the bolls and seed across the holes in the concave screen, and prevent them from falling through it. The bolt H is made of thin boards, with holes about five-eighths an inch in diameter and about five-eighths of an inch apart. The front end is hung on rods $G^4$ by eyes $G^2$, and the rear end on the top bar, H', by the links $H^2$. It is traversed or shaken by the links I, which are attached to the cranks I' of the shaft J, which turns in boxes on the posts $A^3$, and is turned by the pulley J' with a belt from the pulley $J^2$ on the shaft C of the thrashing-cylinder. There is a roller on the shaft J, and another roller, K, under the concave G, which rollers carry the endless apron K' under the bolt H to receive the bolls and seed from the bolt and carry them to the hulling-concave D', where the bolls are broken and stripped from the seed, which is thrown over the front of the concave onto the shoe L, where it is fanned and screened. The shoe L is made in the form shown in the drawings, and hung by the links L', and provided with one or more screens, M, No. 12, or one hundred and forty-four openings in a square inch. If two screens are used, the first may be No. 8. The screened seed escapes from the shoe in the center at the bottom, while the light chaff is blown over the tail of the shoe by the blast from the fan N through the opening M' in the shoe. The tailings pass out of the shoe through an opening at $M^2$. The shoe L is shaken by the bell-crank $L^2$ on the post $A^2$, worked by the link P from the crank P' on the fan-shaft. The shaft of the fan N turns in boxes on the posts A', and is carried by the pulley P' with a belt from the pulley $P^2$ on the shaft C. The fan N is made in the form shown, and the air is blown through the opening N' into the opening M' in the shoe. The feed-table Q is fastened to the bars B', which support it in front of the thrashing-cylinder.

I contemplate that various modifications of my thrashing and hulling devices may be made without departing from the principles or merits of my invention, and that the surface of the cylinder between the thrashing-teeth may be made smooth, and also the tops of the ribs of the hulling-concave, and the sides of the thrashing-teeth and the sides of the ribs or grooves in the concave roughened to do the hulling, as shown in Figs. 3 and 4 of the drawings; or, that the surface of the cylinder between the thrashing teeth and the sides and ends of the thrashing-teeth may be roughened and adopted to hulling, and also the tops and sides of the ribs and the bottoms of the grooves roughened for the same purpose.

I believe I have described and represented my improved machine for thrashing and hulling clover-seed, so as to enable any person skilled in the art to make and use it without further invention or experiment.

I will now state what I desire to secure by Letters Patent, to wit:

1. A rotating thrashing and hulling cylinder with a thrashing concave or arch above and a hulling concave or arch below, substantially as described, so as to thrash the seed from the straw and stalks and hull it at one operation with one and the same cylinder.

2. Providing a toothed thrashing-cylinder with a rough or hulling surface between the teeth.

3. In combination with a toothed thrashing-cylinder having a roughened or hulling surface between the teeth, a ribbed concave or arch with a roughened or hulling surface on the face of the ribs, with grooves between the ribs for the thrashing-teeth of the cylinder to travel in or through, substantially as described.

4. In combination with a picking-cylinder, the ribs on a perforated concave screen to hold up the straw and stalks and allow the bolls and seed to fall through the screen, and prevent the straw and stalks from dragging or carrying the bolls and seed across the holes in the screen.

5. Arranging the crank-shaft to operate the bolt at the rear end of the machine when said crank-shaft is also used to carry the conveying apron or belt K', substantially as described.

JOHN C. BIRDSELL.

Witnesses:
   J. DENNIS, Jr.,
   D. ROWLAND.